(12) United States Patent
Reinmuth

(10) Patent No.: US 12,504,284 B2
(45) Date of Patent: Dec. 23, 2025

(54) MICROMECHANICAL COMPONENT FOR A ROTATION RATE SENSOR

(71) Applicant: Robert Bosch GmbH, Stuttgart (DE)

(72) Inventor: Jochen Reinmuth, Reutlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 296 days.

(21) Appl. No.: 18/551,459

(22) PCT Filed: Oct. 5, 2022

(86) PCT No.: PCT/EP2022/077670
§ 371 (c)(1),
(2) Date: Sep. 20, 2023

(87) PCT Pub. No.: WO2023/072541
PCT Pub. Date: May 4, 2023

(65) Prior Publication Data
US 2024/0191993 A1    Jun. 13, 2024

(30) Foreign Application Priority Data
Oct. 27, 2021   (DE) .................... 10 2021 212 100.4

(51) Int. Cl.
*G01C 19/5712*    (2012.01)
(52) U.S. Cl.
CPC ................ *G01C 19/5712* (2013.01)
(58) Field of Classification Search
CPC ................................................ G01C 19/5712
See application file for complete search history.

(56) References Cited

U.S. PATENT DOCUMENTS

| 9,759,563 | B2* | 9/2017 | Loreck | G01C 19/5733 |
| 11,060,866 | B2* | 7/2021 | Blomqvist | G01C 19/574 |

(Continued)

FOREIGN PATENT DOCUMENTS

| DE | 102005051048 A1 | 6/2006 |
| DE | 102010062095 A1 | 5/2012 |

(Continued)

OTHER PUBLICATIONS

International Search Report for PCT/EP2022/077670, Issued Feb. 14, 2023.

*Primary Examiner* — David J Bolduc
(74) *Attorney, Agent, or Firm* — NORTON ROSE FULBRIGHT US LLP

(57) ABSTRACT

A micromechanical component for a rotation rate sensor. The component includes a first rotor which has a first side with a first seismic mass and a second side with a second seismic mass; a first lever element, the first end of which is connected on the first side via a first lever-coupling spring to the first seismic mass and which extends from its first end to its second end on a third side of the first rotor situated between the first side and the second side; a second lever element, the first end of which is connected on the second side via a second lever-coupling spring to the second seismic mass and which extends from its first end to its second end on the third side of the first rotor; and a first lever-element spring via which the first lever element and the second lever element are connected together.

12 Claims, 6 Drawing Sheets

(56) References Cited

U.S. PATENT DOCUMENTS

| | | | | |
|---|---|---|---|---|
| 2011/0023600 | A1* | 2/2011 | Wrede | G01C 19/5712 73/504.13 |
| 2013/0298672 | A1* | 11/2013 | Kuhlmann | G01C 19/5747 73/504.12 |
| 2014/0026662 | A1* | 1/2014 | Anac | G01C 19/56 73/504.12 |
| 2014/0060184 | A1* | 3/2014 | Walther | G01P 15/123 73/504.03 |
| 2014/0083190 | A1* | 3/2014 | Kaack | G01P 15/135 73/514.01 |
| 2014/0260610 | A1* | 9/2014 | McNeil | G01C 19/5712 73/504.12 |
| 2014/0373628 | A1* | 12/2014 | Balslink | G01C 19/5712 73/504.12 |
| 2015/0308828 | A1 | 10/2015 | Jomori et al. | |
| 2016/0231115 | A1 | 8/2016 | Piirainen | |
| 2016/0231116 | A1* | 8/2016 | Piirainen | G01C 19/5747 |
| 2016/0334215 | A1 | 11/2016 | Kato | |
| 2017/0167874 | A1* | 6/2017 | Giambastiani | G01C 19/5726 |
| 2017/0284803 | A1 | 10/2017 | Andersson et al. | |
| 2018/0216935 | A1* | 8/2018 | Senkal | G01C 19/5747 |
| 2018/0231381 | A1* | 8/2018 | Lassl | G01C 19/5747 |
| 2018/0238689 | A1* | 8/2018 | Ruohio | G01P 15/125 |
| 2018/0245920 | A1* | 8/2018 | Laghi | G01C 19/5712 |
| 2018/0283869 | A1* | 10/2018 | Kato | G01C 19/5769 |
| 2018/0292211 | A1 | 10/2018 | Besson et al. | |
| 2018/0306517 | A1 | 10/2018 | Ramakrishan | |
| 2019/0025056 | A1* | 1/2019 | Hughes | G01C 19/5712 |
| 2019/0078887 | A1* | 3/2019 | Bode | G01C 19/5747 |
| 2019/0178645 | A1* | 6/2019 | Senkal | G01C 25/005 |
| 2019/0383612 | A1* | 12/2019 | Geisberger | G01C 19/5747 |
| 2020/0096337 | A1* | 3/2020 | Senkal | G01C 19/5712 |
| 2020/0263990 | A1* | 8/2020 | Kuisma | G01C 19/5712 |
| 2020/0355500 | A1* | 11/2020 | Pruetz | G01C 19/5747 |
| 2021/0333103 | A1* | 10/2021 | Kuehnel | G01C 25/00 |
| 2021/0381832 | A1* | 12/2021 | Prikhodko | G01C 19/5712 |
| 2022/0057208 | A1* | 2/2022 | Prikhodko | G01C 19/5712 |
| 2022/0228864 | A1* | 7/2022 | Reinmuth | G01C 19/5719 |
| 2022/0260372 | A1* | 8/2022 | Geisberger | G01C 19/574 |
| 2023/0038004 | A1* | 2/2023 | Neul | G01C 19/5747 |
| 2023/0095336 | A1* | 3/2023 | Kuehnel | G01C 19/5684 73/504.12 |

FOREIGN PATENT DOCUMENTS

| | | |
|---|---|---|
| JP | H10206078 A | 8/1998 |
| JP | 2007271611 A | 10/2007 |
| JP | 2017096591 A | 6/2017 |
| JP | 2019007940 A | 1/2019 |
| JP | 2019070574 A | 5/2019 |

* cited by examiner

MICROMECHANICAL COMPONENT FOR A ROTATION RATE SENSOR

FIELD

The present invention relates to a micromechanical component for a rotation rate sensor and to a rotation rate sensor. In addition, the present invention relates to a production method for a micromechanical component for a rotation rate sensor.

BACKGROUND INFORMATION

German Patent Application No. DE 10 2010 062 095 A1 describes a rotation rate sensor which has a substrate with a substrate surface, a first rotor affixed to the substrate surface, and a second rotor which is likewise affixed to the substrate surface. While the first rotor can be induced to a first harmonic oscillatory motion about a first axis of rotation aligned perpendicular to the substrate surface, the second rotor can be induced to a second oscillatory motion that extends in opposition to the first harmonic oscillatory motion about a second axis of rotation which is likewise aligned perpendicular to the substrate surface.

SUMMARY

The present invention provides a micromechanical component for a rotation rate sensor, a rotation rate sensor, and a production method for a micromechanical component for a rotation rate sensor.

The present invention provides micromechanical components and rotation rate sensors provided with such components, which may be used both for detecting a rotary motion about a first axis of rotation aligned perpendicular to their substrate surface, and for detecting a rotary motion about a second axis of rotation aligned parallel to the substrate surface and/or about a third axis of rotation aligned parallel to the substrate surface and perpendicular to the second axis of rotation. Despite their wide-ranging applicability, the micromechanical component according to the present invention and the rotation rate sensors able to be realized thereby are relatively robust with regard to vibrations. In addition, the micromechanical components according to the present invention have a design that offers an excellent surface utilization, but nevertheless prevents a decoupling of energy while the individual micromechanical component is in operation. More specifically, the design of the respective micromechanical component according to the present invention features no asymmetry that leads to a false signal under the application of linear or rotary oscillations. A further advantage of the design of the micromechanical component according to the present invention is that it has no mechanical bridge, which makes the production of the micromechanical components of the present invention relatively easy and cost-effective. Another advantage of the micromechanical components according to the present invention is that the components are unaffected by electrical measuring pulses despite their relatively high measuring sensitivity.

In one advantageous embodiment of the micromechanical component of the present invention, the first lever element is connected to the first rotor via a first lever-support spring anchored to the first lever element, and the second lever element is connected to the first rotor via a second lever-support spring anchored to the second lever element. The connection of at least the first lever element via its first lever-support spring, and at least the second lever element via its second lever-support spring to the first rotor improves the desired lever effect of the first lever element and the second lever element.

In addition, according to an example embodiment of the present invention, the micromechanical component is preferably also developed with a third lever element, the first end of which is fastened on the first side to the first seismic mass via a third lever-coupling spring and which extends from its first end to its second end on a fourth side of the first rotor situated between the first side and the second side; a fourth lever element, the first end of which is connected on the second side via a fourth lever-coupling spring to the second seismic mass, and which extends from its first end to its second end on the fourth side of the first rotor; and a second lever-element spring, via which the third lever element and the fourth lever element are connected to one another. The described development of the first rotor with the first lever element, the second lever element, the third lever element, the fourth lever element, the first lever-element spring and the second lever-element spring realizes a lever structure at the first rotor, which is in mirror symmetry both with regard to a first axis of symmetry that centrally intersects the first seismic mass and the second seismic mass, and in mirror symmetry with regard to a second axis of symmetry which extends between the first seismic mass and the second seismic mass.

As an advantageous further refinement, the micromechanical component of the present invention may additionally also be developed with a second rotor, which is situated on the third side of the first rotor and developed on the first side with a third seismic mass, which is connected via at least one third mass-coupling spring to the second rotor, and on the second side with a fourth seismic mass, which is connected via at least one fourth mass-coupling spring to the second rotor, and fastened to the substrate surface via at least one second rotor-coupling spring in such a way that the second rotor together with the third seismic mass and the fourth seismic mass is able to be induced to a second harmonic oscillatory motion about a second axis of rotation aligned perpendicular to the substrate surface and parallel to the first axis of rotation; a fifth lever element, the first end of which is fastened on the first side via a fifth lever-coupling spring to the third seismic mass and extends from its first end to its second end on a side of the second rotor facing the first rotor; a sixth lever element, the first end of which is fastened on the second side to the fourth seismic mass via a sixth lever-coupling spring and extends from its first end to its second end on the side of the second rotor facing the first rotor; and a third lever-element spring, via which the fifth lever element and the sixth lever element are connected to one another. The described embodiment of the micromechanical component thus has two rotors which are developed in mirror symmetry with one another and can be induced to inversely phased oscillatory motions. When rotary motions of the described embodiment of the micromechanical component are detected, it is therefore possible to also utilize the advantages of differential-signal evaluations.

Preferably, according to an example embodiment of the present invention, the micromechanical component is additionally also developed with a seventh lever element, the first end of which is connected on the first side via a seventh lever-coupling spring to the third seismic mass and which extends from its first end to its second end on a side of the second rotor facing away from the first rotor; an eighth lever element, the first end of which is connected on the second side via an eighth lever-coupling spring to the fourth seismic mass and which extends from its first end to its second end on the side of the second rotor facing away from the first rotor; and a fourth lever-element spring, via which the seventh lever element and the eighth lever element are connected to one another. Thus, the second rotor may also be developed with a lever structure made up of the fifth lever element, the sixth lever element, the seventh lever element, the eighth lever element, the third lever-element spring and the fourth lever-element spring, which are in mirror symmetry both with regard to a first axis of symmetry which centrally intersects the third seismic mass and the fourth seismic mass, and with regard to a fourth axis of symmetry which extends between the third seismic mass and the fourth seismic mass.

As a further advantageous refinement of the present invention, the first lever-element spring and the third lever-element spring may be connected to one another via a spring element. Using the spring element, a desired phase opposition of the second harmonic oscillatory motion of the second rotor together with the third seismic mass and the fourth seismic mass relative to the first harmonic oscillatory motion of the first rotor together with the first seismic mass and the second seismic mass is able to be ensured.

As an alternative or in addition, according to an example embodiment of the present invention, the first seismic mass and the third seismic mass may be connected to one another via a first rocker element, and the second seismic mass and the fourth seismic mass may be connected to one another via a second rocker element. The first rocker element and the second rocker element also make it possible to ensure the desired phase opposition of the second harmonic oscillatory motion of the second rotor with the third seismic mass and the fourth seismic mass relative to the first harmonic oscillatory motion of the first rotor with the first seismic mass and the second seismic mass.

In a preferred manner, according to an example embodiment of the present invention, exactly four fastening structures are fastened to the substrate surface, which are developed from at least one material layer at least partially covering the substrate surface, a first fastening structure of the four fastening structures projecting into a first recess developed in the first rotor, and the first rotor being connected via the at least one first rotor-coupling spring to the first fastening structure; a second fastening structure of the four fastening structures projecting into a second recess developed in the second rotor, and the second rotor being fastened via the at least one second rotor-coupling spring to the second fastening structure; the first rocker element being connected via a first rocker-support spring anchored to the first rocker element to a third fastening structure of the four fastening structures; and the second rocker element being connected via a second rocker-support spring anchored to the second rocker element to a fourth fastening structure of the four fastening structures. The resulting suspension of the two rotors on the exactly four fastening structures ensures a desired deflectability of the two rotors and their seismic masses in response to a rotary motion of the micromechanical component and simultaneously prevents a coupling of mechanical stress.

In one preferred embodiment of the micromechanical component of the present invention, the first seismic mass induced to the first harmonic oscillatory motion is adjustable by a rotary motion of the micromechanical component about a first axis of rotation aligned perpendicular to the substrate surface in a first deflection direction aligned parallel to the substrate surface in relation to the first rotor, while the second seismic mass induced to the first harmonic oscillatory motion is adjustable by the rotary motion of the micromechanical component about the first axis of rotation in a second deflection direction aligned parallel to the substrate surface and directed counter to the first deflection direction in relation to the first rotor. As an alternative or in addition, during a rotary motion of the micromechanical component about a second axis of rotation aligned parallel to the substrate surface, the first rotor induced to the first harmonic oscillatory motion may be tiltable about a first tilting axis aligned parallel to the substrate surface and perpendicular to the second axis of rotation in relation to the substrate, while during a rotary motion of the micromechanical component about a third axis of rotation aligned parallel to the substrate surface and perpendicular to the second axis of rotation, the first rotor induced to the first harmonic oscillatory motion is tiltable about a second tilting axis aligned parallel to the substrate surface and perpendicular to the first tilting axis in relation to the substrate. In an advantageous manner, at least the first rotor (and possibly also the second rotor) may thus be used for detecting rotary motions of the micromechanical component.

In the same way, a rotation rate sensor having such a micromechanical component realizes the afore-described advantages.

The above-described advantages are also ensured when a corresponding production method for a micromechanical component for a rotation rate sensor is executed. It is expressly pointed out that the production method is able to be further refined according to the afore-described embodiments of micromechanical components of the present invention.

BRIEF DESCRIPTION OF THE DRAWINGS

Further features and advantages of the present invention will be described in the following text with the aid of the figures.

DETAILED DESCRIPTION OF EXAMPLE EMBODIMENTS

Figure 1:
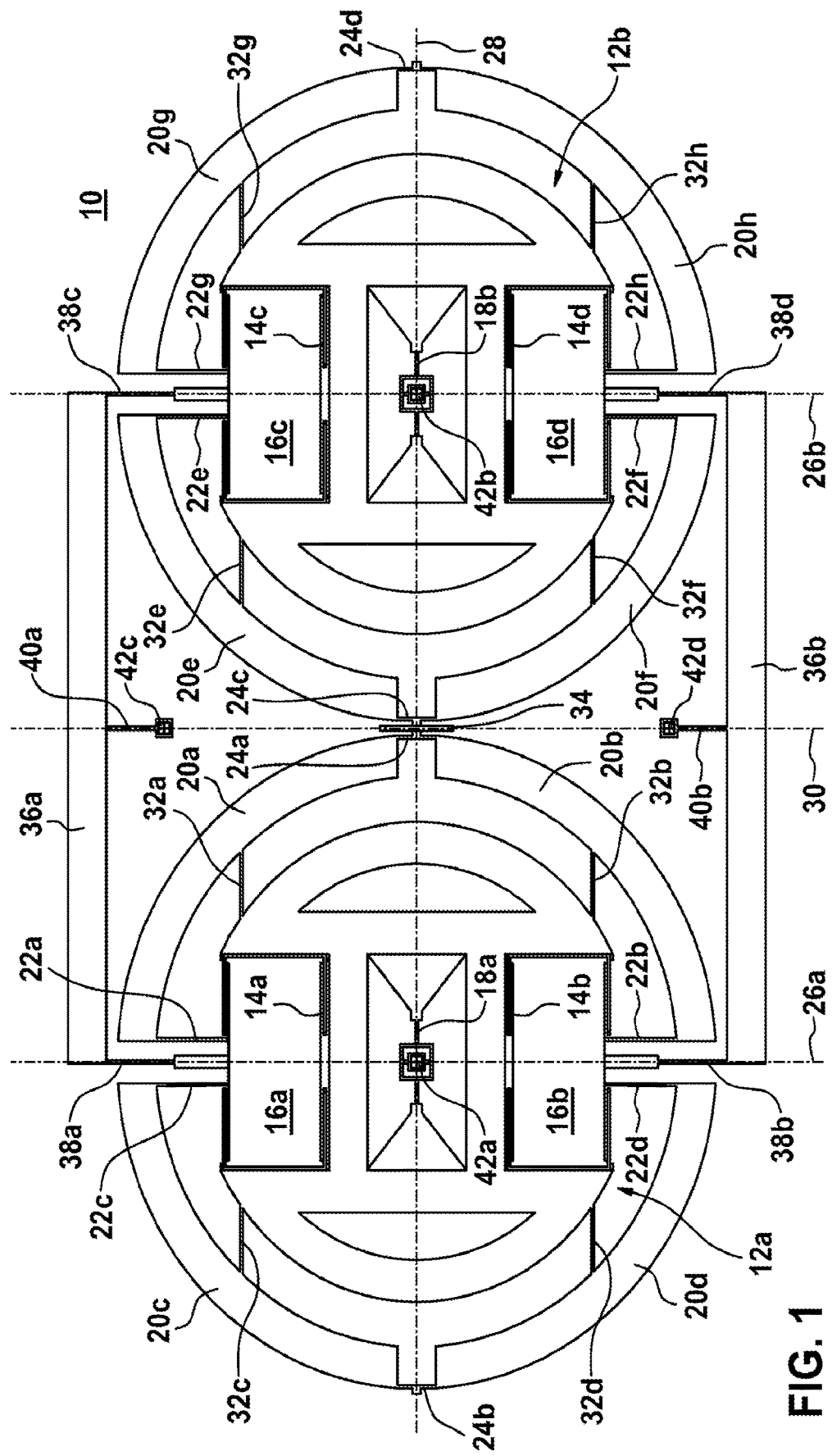
FIG. 1 shows a schematic representation of a first embodiment of the micromechanical component according to the present invention.

FIG. 1 shows a schematic representation of a first embodiment of the micromechanical component.

The micromechanical component schematically illustrated in FIG. 1 includes at least one substrate having a substrate surface 10 and a first rotor 12a. The micromechanical component is preferably also developed with a second rotor 12b. On a first side of first rotor 12a and possibly also of second rotor 12b, first rotor 12a is developed with a first seismic mass 16a, which is connected to first rotor 12a via at least one first mass-coupling spring 14a. On a second side of first rotor 12a facing away from the first side and possibly also of second rotor 12b, first rotor 12a furthermore has a second seismic mass 16b, which is connected to first rotor 12a via at least one second mass-coupling spring 14b. If provided, second rotor 12b is positioned on a third side of first rotor 12a situated between the first side and the second side. In such a case, second rotor 12b will then be developed on the first side with a seismic mass 16c connected to second rotor 12b via at least one third mass-coupling spring 14c, and on the second side with a fourth seismic mass 16d connected to second rotor 12b via at least one fourth mass-coupling spring 14d.

Via at least one first rotor-coupling spring 18a, first rotor 12a is connected to substrate surface 10a in such a way that first rotor 12a together with first seismic mass 16a and second seismic mass 16b can be induced to a first harmonic oscillatory motion about a first axis of rotation aligned perpendicular to substrate surface 10. Second rotor 12b, too, may be connected via at least one second rotor-coupling spring 18b to substrate surface 10 in such a way that second rotor 12b together with third seismic masses 16c and fourth seismic mass 16d is able to be induced to a second harmonic oscillatory motion about a second axis of rotation aligned perpendicular to substrate surface 10 and parallel to the first axis of rotation.

First rotor 12a is equipped with at least a first lever element 20a and a second lever element 20b. First lever element 20a is formed in such a way that first lever element 20a extends from its first end on the first side to its second end situated on the third side of first rotor 12a. Accordingly, second lever element 20b extends from its first end on the second side to its second end on the third side of first rotor 12a. While the first end of first lever element 20a is connected to first seismic mass 16a via a first lever-connection spring 22a, and second lever element 20b is connected at its first end to second seismic mass 16b via a second lever-connection spring 22b, first lever element 20a and second lever element 20b are connected to one another via a first lever-element spring 24a. In particular, the second end of first lever element 20a may be connected via first lever-element spring 24a to the second end of second lever element 20b. At least first lever element 20a, second lever element 20b, and first lever-element spring 24a realize a lever structure of first rotor 12a, which reliably ensures a desired adherence to the first harmonic oscillatory motion of first rotor 12a together with first seismic mass 16a and second seismic mass 16b.

The lever structure of first rotor 12a preferably also includes a third lever element 20c, a fourth lever element 20d, and a second lever-element spring 24b. Third lever element 20c then extends from its first end on the first side to its second end on a fourth side of first rotor 12a situated between the first side and the second side. Fourth lever element 20d, too, may be formed in such a way that it extends from its first end on the second side to its second end situated on the fourth side of first rotor 12a. In addition, the first end of third lever element 20c may be connected via a third lever-coupling spring 22c, and the first end of fourth lever element 20d via a fourth lever-coupling spring 22d to their adjacently situated seismic mass 16a or 16b in each case. Via second lever-element spring 24b, third lever element 20c and fourth lever element 20d, especially the second end of third lever element 20c and the second end of fourth lever element 20d in this embodiment, are connected to each other. The lever structure of first rotor 12a is thus in mirror symmetry with regard to an axis of symmetry 26a of first rotor 12a, which intersects first seismic mass 16a and second seismic mass 16b, and with regard to a first common axis of symmetry 28 of first rotor 12a and second rotor 12b, which intersects first rotor 12a and second rotor 12b.

Second rotor 12b may also be equipped with a fifth lever element 20e, a sixth lever element 20f, and a third lever-element spring 24c. In this case, fifth lever element 20e extends from its first end on the first side to its second end on a side of second rotor 12b facing first rotor 12a. Accordingly, sixth lever element 20f may also be developed in such a way that it extends from its first end on the second side to its second end on the side of second rotor 12b facing first rotor 12a. The first end of fifth lever element 20e is preferably connected to third seismic mass 16c via a fifth lever-coupling spring 22e, while the first end of sixth lever element 20f may be connected via a sixth lever-coupling spring 22f to fourth seismic mass 16d. In addition, fifth lever element 20e and sixth lever element 20f, in particular their second ends, may be connected to one another via third lever-element spring 24c. Thus, second rotor 12b may also be equipped with a lever structure made up of at least fifth lever element 20e, sixth lever element 20f, and third lever-element spring 24c, which contributes to the reliable observance of the second harmonic oscillatory motion of second rotor 12b together with third seismic mass 16c and fourth seismic mass 16d. Fifth lever element 20e, sixth lever element 20f, and third lever-element spring 24c are preferably in mirror symmetry with first lever element 20a, second lever element 20b, and first lever-element spring 24a with regard to a second common axis of symmetry 30 of first rotor 12a and second rotor 12b, which extends between first rotor 12a and second rotor 12b.

As an advantageous refinement, the lever structure of second rotor 12b may also include a seventh lever element 20g, which extends from its first end on the first side to its second end on a side of second rotor 12b facing away from first rotor 12a; an eighth lever element 20h, which extends from its first end on the second side to its second end on the side of second rotor 12b facing away from first rotor 12a, and a fourth lever-element spring 24d. While the first end of seventh lever element 20g is connected via a seventh lever-coupling spring 22g to third seismic mass 16c, the first end of eighth lever element 20h may be connected to fourth seismic mass 16d via an eighth lever-coupling spring 22h. In addition, seventh lever element 20g and eighth lever element 20h, in particular their second ends, may be connected to one another via fourth lever-element spring 24d. Seventh lever element 20g, eighth lever element 20h, and fourth lever-element spring 24d may be in mirror symmetry with fifth lever element 20e, sixth lever element 20f, and third lever-element spring 24c with regard to an axis of symmetry 26b of second rotor 12b, which intersects third seismic mass 16c and fourth seismic mass 16d. The lever structure of second rotor 12b is preferably also in mirror symmetry with regard to first common axis of symmetry 28 of first rotor 12a and second rotor 12b, which intersects first rotor 12a and second rotor 12b. In addition, the lever structure of second rotor 12b may be developed in mirror symmetry with the lever structure of first rotor 12a with regard to common second axis of symmetry 30 of first rotor 12a and second rotor 12b, which extends between first rotor 12a and second rotor 12b.

All lever elements 20a to 20h bring about an advantageous mechanical coupling of their linked seismic mass 16a to 16d with their respective rotor 12a or 12b. The at least one lever-element spring 24a to 24d is preferably a flexible spring such as a flexible leaf spring.

Each lever element 20a to 20h is additionally fastened to assigned rotor 12a or 12b via a lever-support spring 32a to 32h anchored to respective lever element 20a to 20h. Respective lever-support spring 32a to 32h improves the lever function of lever element 20a to 20h equipped with it. For example, a flexible spring, especially a flexible leaf spring, may be used as the at least one lever-support spring 32a to 32h.

A flexible spring, especially a flexible leaf spring, may also be used as the at least one lever-coupling spring 22a to 22h. In each one of lever elements 20a to 20h, the lever-coupling spring 22a to 22h anchored to the respective lever element 20a to 20h and the lever-support spring 32a to 32h anchored to the same lever element 20a to 20h are tilted relative to one another at a tilting angle of between 30° and 90°, especially aligned perpendicular to one another. This improves the lever effect of lever elements 20a to 20h.

It is also advantageous if first lever-element spring 24a and third lever-element spring 24c are connected to each other via a spring element 34. With the aid of spring element 34, the desired observance of a phase shift of 180° between the first harmonic oscillatory motion of first rotor 12a and the second harmonic oscillatory motion of second rotor 12b is able to be ensured. In this case, the first harmonic oscillatory motion of first rotor 12a is in phase opposition to the second harmonic oscillatory motion of second rotor 12b. Spring element 34, for example, may include two torsionally soft springs which are aligned parallel to second common axis of symmetry 30, such as especially two leaf springs aligned parallel to second common axis of symmetry 30, the first ends of the torsionally soft springs/leaf springs and the second ends of the torsionally soft springs/leaf springs being connected to one another via a connection section in each case.

As an alternative or in addition, first seismic mass 12a and third seismic mass 12c may be connected to each other via a first rocker element 36a, while second seismic mass 12b and fourth seismic mass 12d are connected to each other via a second rocker element 36b. The use of rocker elements 36a and 36b also makes it possible to ensure the desired observance of the phase shift of 180° between the first harmonic oscillatory motion of first rotor 12a and the second harmonic oscillatory motion of second rotor 12b. For example, first rocker element 36a may be connected via a first rocker-coupling spring 38a to first seismic mass 12a, and via a third rocker-coupling spring 38c to third seismic mass 12c. Accordingly, second rocker element 36b may be connected via a second rocker-coupling spring 38b to second seismic mass 12b and via a fourth rocker-connection spring 38d to fourth seismic mass 12d. Each rocker-coupling spring 38a to 38d is preferably a flexible or torsionally soft spring such as a flexible or torsionally soft leaf spring. To improve its rocker function, first rocker element 36a may be fastened to substrate surface 10 at least via a first rocker-support spring 40a anchored to first rocker element 36a and second rocker element 36b at least via a second rocker-support spring 40b anchored to second rocker element 36b. A torsionally soft spring, in particular a torsionally soft leaf spring, for example, may be used as rocker-support spring 40a and 40b in each case.

Preferably, first rotor 12a is centrally suspended (that is, in its center of mass) on substrate surface 10 via its at least one first rotor-coupling spring 18a. More specifically, in the embodiment described here, a first fastening structure 42a is fixed in place on substrate surface 10 for this purpose, which projects into a first recess developed in first rotor 12a. First rotor 12a may then be fastened via its at least one first rotor-coupling spring 18a anchored to an edge of the first recess to first fastening structure 42a. For instance, first fastening structure 42a may be positioned in a cardanic manner between the two first rotor-coupling springs 18a of first rotor 12a. A second fastening structure 42b fastened to substrate surface 10 may possibly also project into a second recess of second rotor 12b such that second rotor 12b is connected via the at least one second rotor-coupling spring 18b anchored to an edge of the second recess to second fastening structure 42b. Second fastening structure 42b, too, may be positioned between two second rotor-coupling springs 18b of second rotor 12b in a cardanic fashion.

In addition, first rocker element 36a may be connected via first rocker-support spring 40a to a third fastening structure 42c, and second rocker element 36b may be connected via second rocker-support spring 40b to a fourth fastening structure 42d. Preferably, only the four fastening structures 42a to 42d are fastened to substrate surface 10. The suspension of rotors 12a and 12b on substrate surface 10 via only the four fastening structures 42a to 42d ensures an advantageous adjustability of rotors 12a and 12b and/or their seismic masses 16a to 16d in response to rotary motions of the micromechanical component. For the realization of the advantageous connection of the four fastening structures 42a to 42d to substrate surface 10, fastening structures 42a to 42d may be developed from at least one material layer that at least partially covers substrate surface 10. The four fastening structures 42a to 42d may be positioned in a relatively centralized and symmetrical manner with one another. In this case, the micromechanical component responds much less sensitively to bending of its substrate.

The micromechanical component described here may advantageously be used for a rotation rate sensor. To describe the harmonic oscillatory motions of its rotors 12a and 12b and the reactions of rotors 12a and 12b and/or seismic masses 16a to 16d to rotary motions of the micromechanical component, reference is made to the description of the following embodiment.

FIGS. 2A to 2E show schematic representations of a second embodiment of the micromechanical component.

Figure 2A:
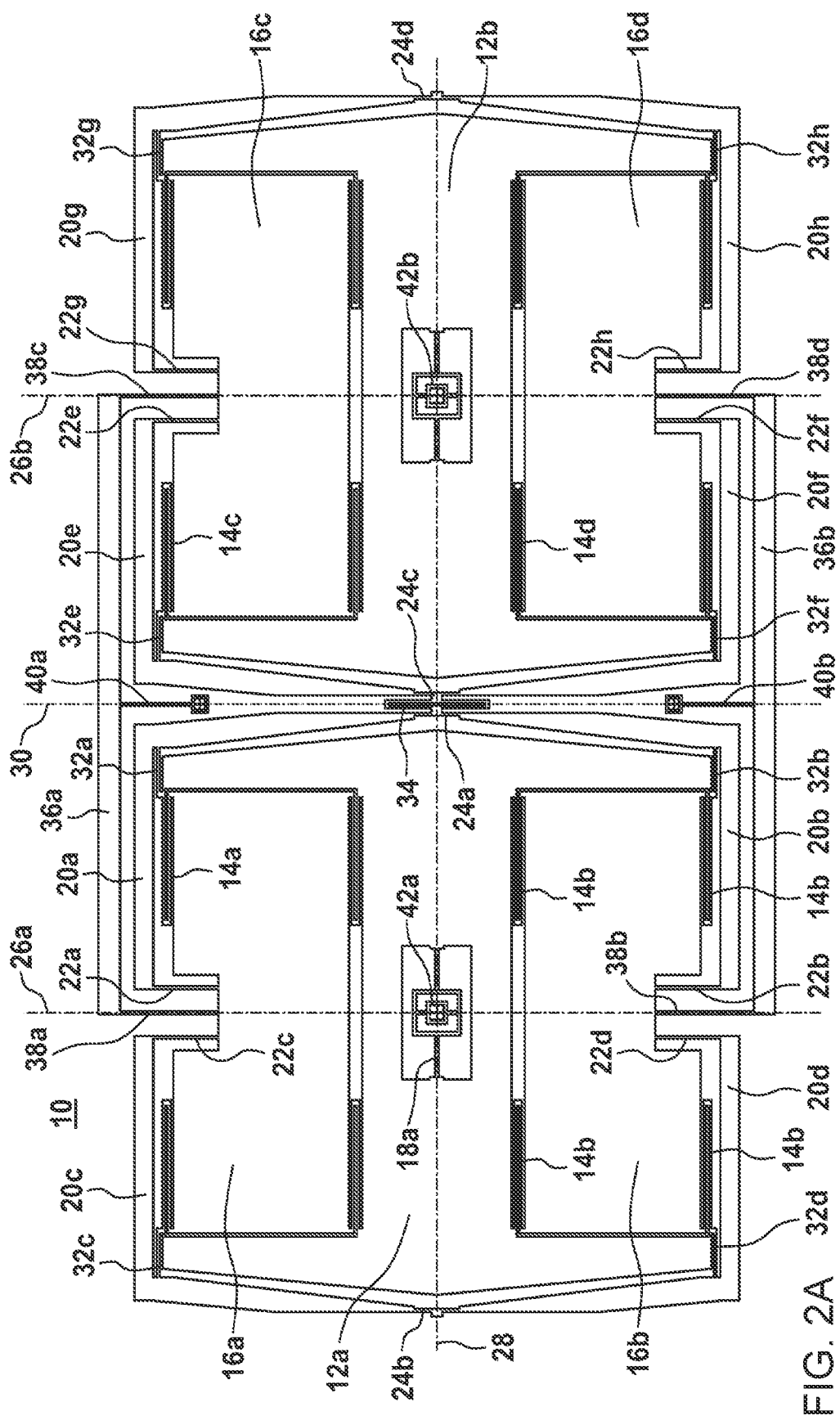
FIGS. 2A to 2E show schematic representations of a second embodiment of the micromechanical component of the present invention.

The micromechanical component, shown in its neutral position in FIG. 2A, has the components of the above-described embodiment.

Reference to the description of FIG. 1 is made with regard to the features of these components and their advantages.

Figure 2B:
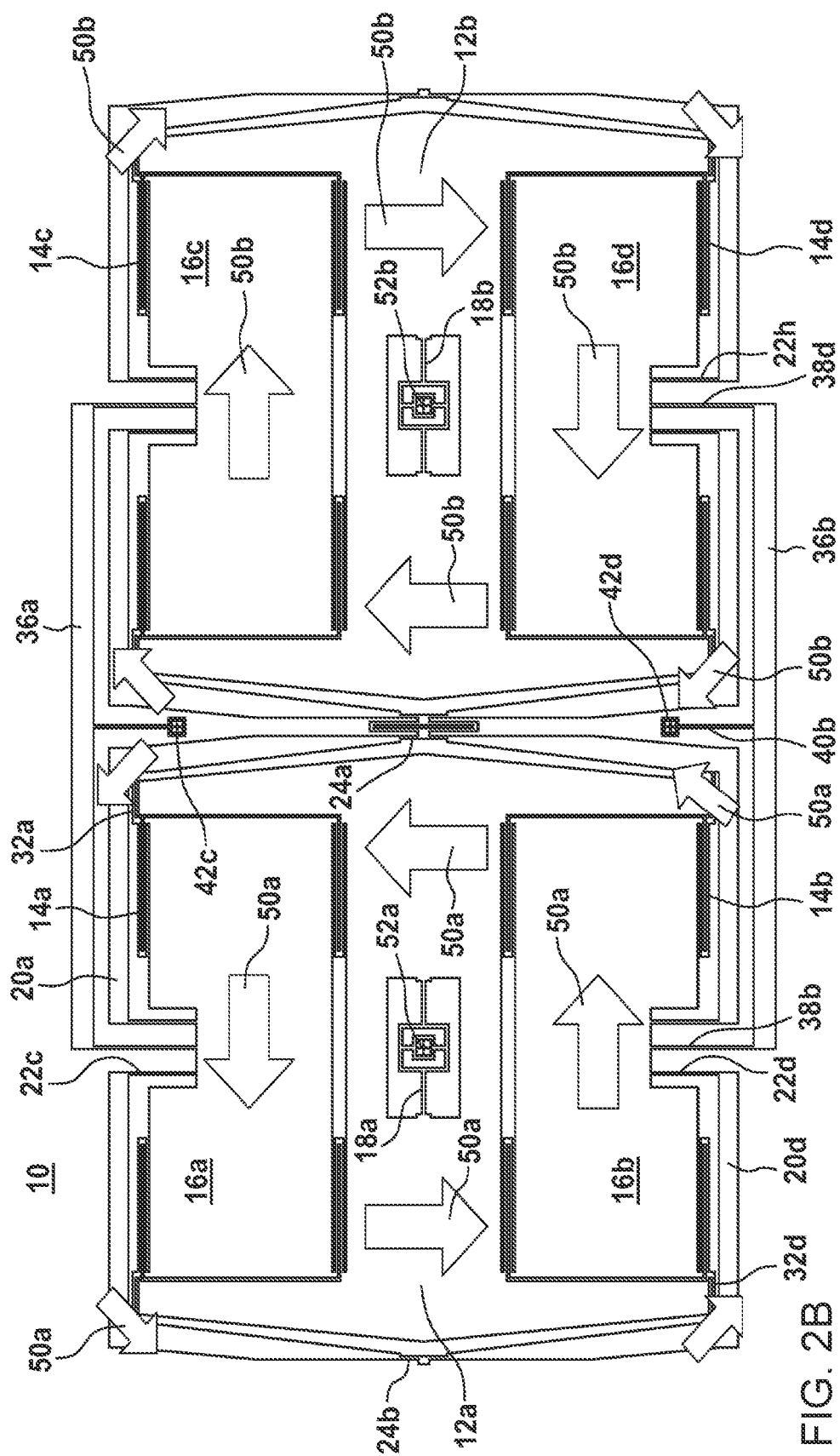

In FIG. 2B, arrows 50a are used to illustrate the first harmonic oscillatory motion of first rotor 12a together with its first seismic mass 16a and its second seismic mass 16b about first axis of rotation 52a, and arrows 50b are used to illustrate the second harmonic oscillatory motion of second rotor 12b together with its third seismic mass 16c and its fourth seismic mass 16d about second axis of rotation 52b. It can be gathered that the second harmonic oscillatory motion of second rotor 12b together with its third seismic mass 16c and its fourth seismic mass 16d is in phase opposition (i.e., phase-shifted by 180°) to the first harmonic oscillatory motion of first rotor 12a together with its first seismic mass 16a and its second seismic mass 16b. First rotor 12a and second rotor 12b thus form an inversely oscillating double rotor. First rotor 12a and second rotor 12b together with their seismic masses 16a to 16d are able to be induced to their respective harmonic oscillation with the aid of an actuator device (not shown in the drawing) in each case. Since exemplary embodiments of such an actuator device are described in the related art, no further description will be provided here.

Figure 2C:
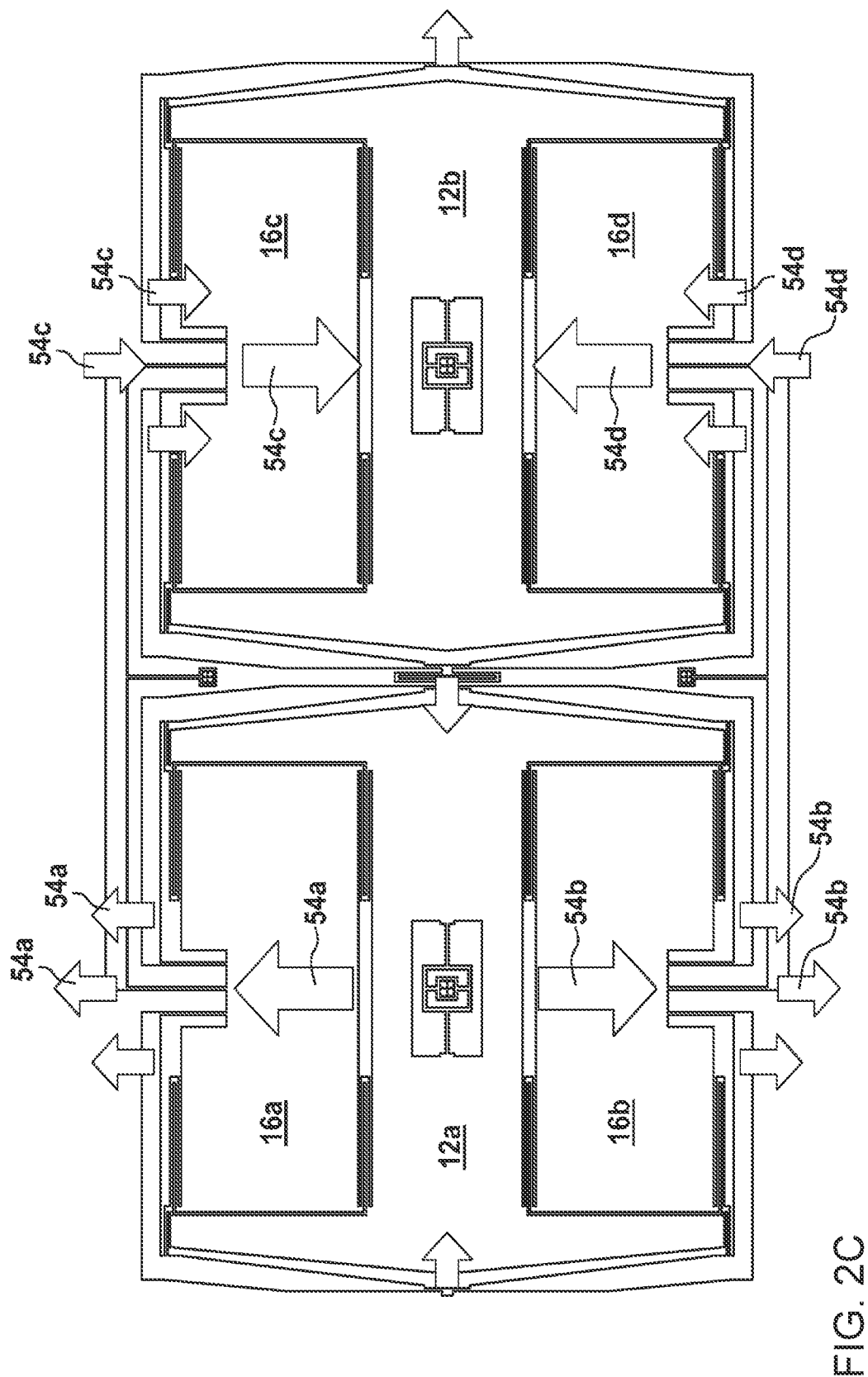

FIG. 2C shows the micromechanical component in which first rotor 12a and second rotor 12b together with their seismic masses 16a to 16d are induced to their respective harmonic oscillatory motion in response to a rotary motion of the micromechanical component about a first axis of rotation aligned perpendicular to substrate surface 10. (Since the first axis of rotation is aligned perpendicular to the image plane of FIG. 2C representing substrate surface 10, it is not shown in the drawing.) As illustrated in FIG. 2C with the aid of arrows 54a, the rotary motion of the micromechanical component about the first axis of rotation aligned perpendicular to substrate surface 10 induces an adjustment movement of first seismic mass 16a induced to the first harmonic oscillatory motion in a first deflection direction aligned parallel to substrate surface 10 in relation to first rotor 12a. In contrast, as indicated by arrows 54b, the second seismic mass 16b, induced to the first harmonic oscillatory motion by the rotary motion of the micromechanical component about the first axis of rotation, is adjusted to a second deflection direction aligned parallel to substrate surface 10 and counter to the first deflection direction in relation to first rotor 12a. Because of the oppositely directed deflection directions of seismic masses 16a and 16b, their adjustment movements triggered by the rotary motion of the micromechanical component about the first axis of rotation can be clearly distinguished from acceleration-triggered deflection movements of seismic masses 16a and 16b in a common direction.

The inversely phased harmonic oscillatory motions of rotors 12a and 12b and their seismic masses 16a to 16d furthermore have the effect that because of the rotary motion of the micromechanical component about the first axis of rotation, the third seismic mass 16c induced to the second harmonic oscillatory motion is adjusted in the second deflection direction (see arrows 54c), and the fourth seismic mass 16d likewise induced to the second harmonic oscillatory motion is adjusted in the first deflection direction (see arrows 54d) in relation to second rotor 12b. Mass-coupling springs 14a to 14d via which seismic masses 16a to 16d are coupled to their respective rotor 12a or 12b may have a relatively soft development in the direction of the first deflection direction and the second deflection direction. Leaf springs, for instance, may be used for springs 14a to 14d.

The adjustment movements of seismic masses 16a to 16d in their respective deflection direction illustrated with the aid of arrows 54a to 54d, are able to be reliably detected due to the advantageous symmetry of the micromechanical component with regard to common axis of symmetry 28 and 30 by the use of symmetric detection electrodes and with the aid of an evaluation of at least one of the differential signals supplied by the detection electrodes. The micromechanical component may therefore be advantageously used for detecting a rotary motion about the first axis of rotation and/or for measuring a first rate of rotation of a rotary motion about the first axis of rotation.

Figure 2D:
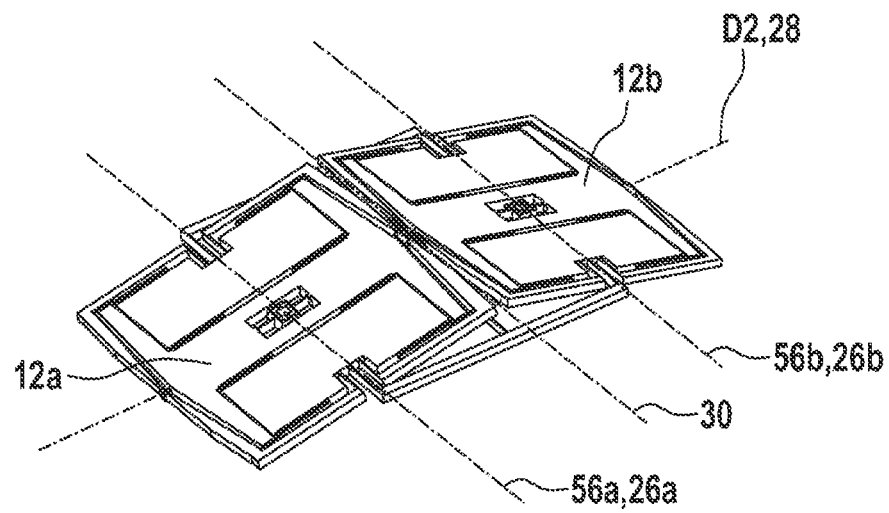

FIG. 2D shows the micromechanical component in which first rotor 12a and second rotor 12b together with their seismic masses 16a to 16d are induced to their respective harmonic oscillatory motion during a rotary motion of the micromechanical component about a second axis of rotation D2 aligned parallel to substrate surface 10. Simply by way of example, second axis of rotation D2 is equal to first common axis of symmetry 28 of first rotor 12a and second rotor 12b.

It can be gathered that first rotor 12a, induced to the first harmonic oscillatory motion by the rotary motion of the micromechanical component about second axis of rotation D2, is tilted about a first tilting axis 56a in relation to the substrate. First tilting axis 56a is aligned parallel to substrate surface 10 but perpendicular to second axis of rotation D2. The rotary motion of the micromechanical component about second axis of rotation D2 therefore also triggers a tilting motion of second rotor 12b, induced to the second harmonic oscillatory motion, about a second tilting axis 56b, second tilting axis 56b being aligned parallel to first tilting axis 56a. In particular, first tilting axis 56a of first rotor 12a may lie on axis of symmetry 26a of first rotor 12a, while second tilting axis 56b of the second rotor is congruent with axis of symmetry 26b of second rotor 12b.

Because of the inversely phased harmonic oscillatory motions of rotors 12a and 12b and their seismic masses 16a to 16d, the tilting motions of rotors 12a and 12b about their respective tilting axis 56a and 56b triggered by the rotary motion of the micromechanical component about second axis of rotation D2 are furthermore in mirror symmetry with regard to second common axis of symmetry 30 of first rotor 12a and second rotor 12b that extends parallel to tilting axes 56a and 56b. For that reason, the tilting motions of rotors 12a and 12b about their respective tilting axis 56a and 56b triggered by the rotary motion of the micromechanical component about second axis of rotation D2 are able to be reliably detected with the aid of an evaluation of the at least one differential signal supplied by the symmetrical detection electrodes. In an advantageous manner, the micromechanical component may thus be used for detecting a rotary motion about second axis of rotation D2 and/or for measuring a second rate of rotation of a rotary motion about second axis of rotation D2.

Figure 2E:
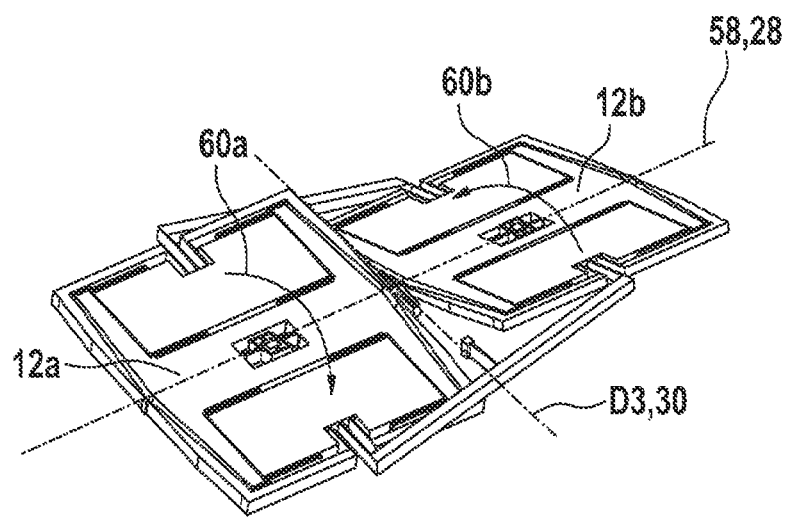

FIG. 2E shows the micromechanical component in which first rotor 12a and second rotor 12b together with their seismic masses 16a to 16d are induced to their respective harmonic oscillatory motion during a rotary motion of the micromechanical component about a third axis of rotation D3 aligned parallel to substrate surface 10 and perpendicular to second axis of rotation D2. Third axis of rotation D3, for example, may be equal to second common axis of symmetry 30 of first rotor 12a and second rotor 12b.

The rotary motion of the micromechanical component about third axis of rotation D3 causes first rotor 12a induced to its first harmonic oscillatory motion, and second rotor 12b induced to its second harmonic oscillatory motion to be tilted about a common tilting axis 58 aligned parallel to substrate surface 10 and perpendicular to third axis of rotation D3 in relation to the substrate in each case. However, because of the 180° phase shift between the harmonic oscillatory motions, first rotor 12a induced to its first harmonic oscillatory motion is tilted in a first direction of rotation 60a about tilting axis 58 in relation to the substrate, whereas second rotor 12b induced to its second harmonic oscillatory motion is rotated in a second direction of rotation 60b directed counter to first direction of rotation 60a in relation to the substrate. For that reason, the tilting motions of rotors 12a and 12b about tilting axis 58 triggered by the rotary motion of the micromechanical component about third axis of rotation D3 are able to be reliably detected with the aid of an evaluation of the at least one differential signal supplied by the symmetrical detection electrodes. As a result, the micromechanical component may also be used to advantage for detecting a rotary motion about third axis of rotation D3 and/or for measuring a third rate of rotation of a rotary motion about third axis of rotation D3.

All of the afore-described micromechanical components may be utilized for realizing vibration-robust or highly sensitive rotation rate sensors. Such a rotation rate sensor may be installed especially in regions experiencing high vibrations such as in a vehicle, on a pump or on a valve drive, for example. Even when such a rotation rate sensor is used for consumer applications, rotation rates are still reliably measurable despite vibrating alarms and a loudspeaker operation. Its compact development notwithstanding, the inversely oscillating double rotor realized by rotors 12a and 12b may still be used for detecting rotary motions about three directions in space D2 and D3.

The design of the afore-described micromechanical components also allows for an easier miniaturization. A mode density of the design is considerably lower than in the related art, which means that the realization of a rotation rate sensor is possible which has considerably fewer mode jumps that can also be better controlled. A closed-loop concept may also be realized on the respective rotation rate sensor. Because of its relatively low total number of mass elements, each one of the afore-described micromechanical components also has relatively fewer interference modes at high frequencies, which also makes it less susceptible to interference.

It is expressly pointed out that the design of the afore-described micromechanical components does not require a mechanical bridge. As a result, no mass asymmetries caused by mechanical bridges occur in the micromechanical components. Because of its symmetry with regard to common axes of symmetry 28 and 30, no undesired decoupling of energy or systematic offset displacement occurs in any of the afore-described micromechanical components.

The symmetrical detection electrodes are preferably positioned between lever elements 20a to 20h and the substrate. Lever elements 20a to 20h may thus also be used as detection surfaces.

Figure 3:
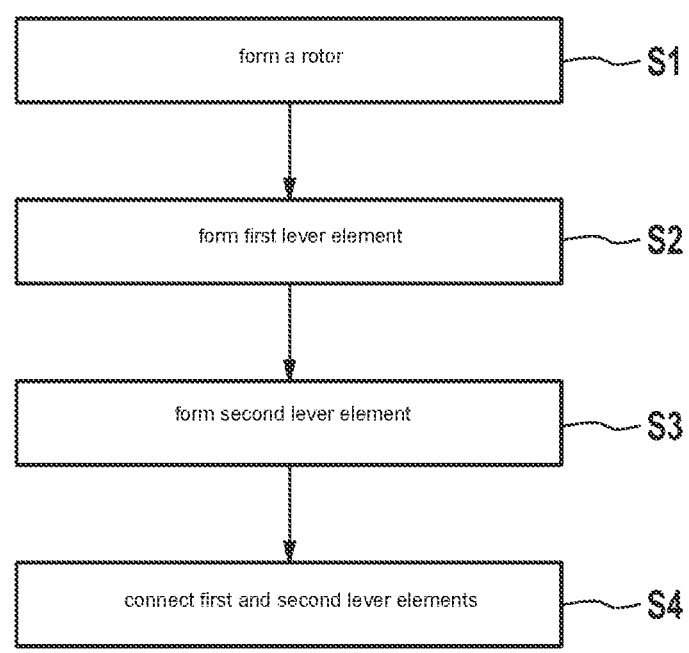
FIG. 3 shows a flow diagram to describe an example embodiment of the production method for a micromechanical component for a rotation rate sensor, according to the present invention.

FIG. 3 shows a flow diagram to describe an embodiment of the production method for a micromechanical component for a rotation rate sensor.

Using the production method described in the following text, the afore-described micromechanical components, for example, are able to be produced. However, it is pointed out here that an executability of the production method is not restricted to the production of one of these components.

In a method step S1, a rotor is formed, which is developed on a first side with a first seismic mass connected to the rotor via at least one first mass-coupling spring, and on a second side facing away from the first side, it is developed with a second seismic mass connected to the rotor via at least one second mass-coupling spring. In addition, the rotor is connected via at least one rotor-coupling spring to a substrate surface of a substrate in such a way that the rotor together with the first seismic mass and the second seismic mass is able to be inducted to a harmonic oscillatory motion about an axis of rotation that is aligned perpendicular to the substrate surface.

In a method step S2, a first lever element is formed, the first end of which is connected on the first side to the first seismic mass via a first lever-coupling spring and which extends from its first end to its second end on a third side of the rotor situated between the first side and the second side. Accordingly, in a method step S3, a second lever element is formed, the first end of which on the second side is connected to the second seismic mass via a second lever-coupling spring and which extends from its first end to its second end on the third side of the rotor. With the aid of a first lever-element spring produced as method step S4, the first lever element and the second lever element are connected to each other.

The described production method is a simple production process which can be performed in a cost-effective manner. The method steps S1 to S4 are able to be carried out in any sequence, overlapping in time or simultaneously. The micromechanical component produced with the aid of the production method can be produced in a very compact manner, is easy to miniaturize yet may still offer a high measuring sensitivity. In addition, the described production method is able to be refined according to the afore-described micromechanical components.

What is claimed is:

1. A micromechanical component for a rotation rate sensor, comprising:
   a substrate having a substrate surface;
   a first rotor, which is developed on a first side with a first seismic mass connected to the first rotor via at least one first mass-coupling spring, and on a second side facing away from the first side with a second seismic mass connected to the first rotor via at least one second mass-coupling spring, and which is connected via at least one first rotor-coupling spring to the substrate surface in such a way that the first rotor together with the first seismic mass and the second seismic mass is able to be induced to a first harmonic oscillatory motion about a first axis of rotation aligned perpendicular to the substrate surface;
   a first lever element, a first end of the first lever element being connected on the first side via a first lever-coupling spring to the first seismic mass, the first lever element extending from its first end to a second end on a third side of the first rotor situated between the first side and the second side;
   a second lever element, a first end of which is connected on the second side via a second lever-coupling spring to the second seismic mass and which extends from its first end to its second end on the third side of the first rotor; and
   a first lever-element spring, via which the first lever element and the second lever element are connected to one another.

2. The micromechanical component as recited in claim 1, wherein the first lever element is connected to the first rotor via a first lever-support spring anchored to the first lever element, and the second lever element is connected to the first rotor via a second lever-support spring anchored to the second lever element.

3. The micromechanical component as recited in claim 1, further comprising:
   a third lever element, a first end of which on the first side is connected via a third lever-coupling spring to the first seismic mass and which extends from its first end to its second end on a fourth side of the first rotor situated between the first side and the second side;
   a fourth lever element, a first end of which is connected on the second side via a fourth lever-coupling spring to the second seismic mass and which extends from its first end to its second end on the fourth side of the first rotor, and
   a second lever-element spring, via which the third lever element and the fourth lever element are connected to each other.

4. The micromechanical component as recited in claim 3, further comprising:
   a second rotor, which is situated on the third side of the first rotor and connected on the first side to a third seismic mass connected via at least one third mass-coupling spring to the second rotor, and on the second side with a fourth seismic mass connected via at least a fourth mass-coupling spring to the second rotor, and which is connected via at least one second rotor-coupling spring to the substrate surface in such a way that the second rotor together with the third seismic mass and the fourth seismic mass is able to be induced to a second harmonic oscillatory motion about a second axis of rotation aligned perpendicular to the substrate surface and parallel to the first axis of rotation;

a fifth lever element, a first end of which on the first side is connected via a fifth lever-coupling spring to the third seismic mass, and which extends from its first end to its second end on a side of the second rotor facing the first rotor;

a sixth lever element, a first end of which on the second side is connected via a sixth lever-coupling spring to the fourth seismic mass and which extends from its first end to its second end on the side of the second rotor facing the first rotor; and a third lever-element spring, via which the fifth lever element and the sixth lever element are connected to each other.

5. The micromechanical component as recited in claim 4, further comprising:

a seventh lever element, a first end of which on the first side is connected via a seventh lever-coupling spring to the third seismic mass, and which extends from its first end to its second end on a side of the second rotor facing away from the first rotor;

an eighth lever element, a first end of which is connected on the second side via an eighth lever-coupling spring to the fourth seismic mass and which extends from its first end to its second end on the side of the second rotor facing away from the first rotor; and a fourth lever-element spring, via which the seventh lever element and the eighth lever element are connected to each other.

6. The micromechanical component as recited in claim 4, wherein the first lever-element spring and the third lever-element spring are connected to one another via a spring element.

7. The micromechanical component as recited in claim 4, wherein the first seismic mass and the third seismic mass are connected to each other via a first rocker element, and the second seismic mass and the fourth seismic mass are connected to one another via a second rocker element.

8. The micromechanical component as recited in claim 7, wherein exactly four fastening structures are fastened to the substrate surface, which are developed from at least one material layer which at least partially covers the substrate surface, wherein a first fastening structure of the four fastening structures projects into a first recess developed in the first rotor, and the first rotor is connected via at the least one first rotor-coupling spring to the first fastening structure, wherein a second fastening structure of the four fastening structures projects into a second recess developed in the second rotor, and the second rotor is connected via the at least one second rotor-coupling spring to the second fastening structure, wherein the first rocker element is connected via a first rocker-support spring anchored to the first rocker element to a third fastening structure of the four fastening structures, and wherein the second rocker element is connected via a second rocker-support spring anchored to the second rocker element to a fourth fastening structure of the four fastening structures.

9. The micromechanical component as recited in claim 1, wherein the first seismic mass induced to the first harmonic oscillatory motion is adjustable by a rotary motion of the micromechanical component about a first axis of rotation aligned perpendicular to the substrate surface in a first deflection direction aligned parallel to the substrate surface, in relation to the first rotor, and the second seismic mass induced to the first harmonic oscillatory motion is adjustable by the rotary motion of the micromechanical component about the first axis of rotation in a second deflection direction aligned parallel to the substrate surface and directed counter to the first deflection direction in relation to the first rotor.

10. The micromechanical component as recited in claim 1, wherein during a rotary motion of the micromechanical component about a second axis of rotation aligned parallel to the substrate surface, the first rotor induced to the first harmonic oscillatory motion is tiltable about a first tilting axis aligned parallel to the substrate surface and perpendicular to the second axis of rotation in relation to the substrate, and during a rotary motion of the micromechanical component about a third axis of rotation aligned parallel to the substrate surface and perpendicular to the second axis of rotation, the first rotor induced to the first harmonic oscillatory motion is tiltable about a second tilting axis aligned parallel to the substrate surface and perpendicular to the first tilting axis in relation to the substrate.

11. A rotation rate sensor, comprising:

a micromechanical component, including:

a substrate having a substrate surface, a first rotor, which is developed on a first side with a first seismic mass connected to the first rotor via at least one first mass-coupling spring, and on a second side facing away from the first side with a second seismic mass connected to the first rotor via at least one second mass-coupling spring, and which is connected via at least one first rotor-coupling spring to the substrate surface in such a way that the first rotor together with the first seismic mass and the second seismic mass is able to be induced to a first harmonic oscillatory motion about a first axis of rotation aligned perpendicular to the substrate surface, a first lever element, a first end of the first lever element being connected on the first side via a first lever-coupling spring to the first seismic mass, the first lever element extending from its first end to a second end on a third side of the first rotor situated between the first side and the second side, a second lever element, a first end of which is connected on the second side via a second lever-coupling spring to the second seismic mass and which extends from its first end to its second end on the third side of the first rotor, and a first lever-element spring, via which the first lever element and the second lever element are connected to one another.

12. A production method for a micromechanical component for a rotation rate sensor, comprising the following steps:

forming a rotor, which is developed on a first side with a first seismic mass connected via at least one first mass-coupling spring to the rotor, and on a second side facing away from the first side with a second seismic mass connected via at least one second mass-coupling spring to the rotor, and which is connected via at least one rotor-coupling spring to a substrate surface of a substrate in such a way that the rotor together with the first seismic mass and the second seismic mass is able to be induced to a harmonic oscillatory motion about an axis of rotation aligned perpendicular to the substrate surface;

forming a first lever element, a first end of which is connected on the first side via a first lever-coupling spring to the first seismic mass and which extends from its first end to its second end on a third side of the rotor situated between the first side and the second side; and forming a second lever element, a first end of which is connected on the second side via a second lever-coupling spring to the second seismic mass and which extends from its first end to its second end on the third side of the rotor; and forming a first lever-element spring via which the first lever element and the second lever element are connected to one another.

\* \* \* \* \*